US010017132B1

(12) United States Patent
Griffey

(10) Patent No.: US 10,017,132 B1
(45) Date of Patent: Jul. 10, 2018

(54) LICENSE PLATE FRAME DEVICE

(71) Applicant: Richard Griffey, Nashville, TN (US)

(72) Inventor: Richard Griffey, Nashville, TN (US)

( * ) Notice: Subject to any disclaimer, the term of this patent is extended or adjusted under 35 U.S.C. 154(b) by 3 days.

(21) Appl. No.: 15/609,175

(22) Filed: May 31, 2017

(51) Int. Cl.
*B60R 13/10* (2006.01)
*B60Q 1/56* (2006.01)

(52) U.S. Cl.
CPC .............. *B60R 13/105* (2013.01); *B60Q 1/56* (2013.01)

(58) Field of Classification Search
CPC ..... B60R 13/105; B60R 13/10; B60Q 1/2615; B60Q 1/56; A47G 1/0644; A47G 1/06; A47G 1/143; A47G 1/0605; A47G 1/14; G09F 1/12; G09F 7/18; G09F 21/04; G09F 2007/1895; G09F 15/0012; G09F 13/14
See application file for complete search history.

(56) References Cited

U.S. PATENT DOCUMENTS

| | | | | |
|---|---|---|---|---|
| 4,314,417 A * | 2/1982 | Cain | ..................... | B60R 13/105 40/209 |
| 5,012,602 A * | 5/1991 | Storey | ................... | B60R 13/105 40/201 |
| 9,283,889 B1 * | 3/2016 | Baker | ................... | B60Q 1/2661 |
| D802,506 S * | 11/2017 | Bargen | ......................... | D12/193 |
| 2002/0124444 A1 * | 9/2002 | Davidson | ................ | B60R 13/10 40/209 |
| 2003/0142044 A1 * | 7/2003 | Berry | ..................... | B60Q 1/503 345/55 |
| 2004/0114391 A1 * | 6/2004 | Watkins | ................... | B60Q 1/52 362/542 |
| 2008/0120875 A1 * | 5/2008 | Yen | .......................... | B60Q 1/56 40/204 |
| 2012/0102797 A1 * | 5/2012 | Heo | ........................ | G09F 13/12 40/541 |

\* cited by examiner

*Primary Examiner* — Cassandra Davis
(74) *Attorney, Agent, or Firm* — PatentFile, LLC; Bradley C. Fach; Steven R. Kick

(57) ABSTRACT

A license plate frame device may include a frame which may be movably coupled to a back plate. The frame may comprise an elongate support having a first end and a second end. A first vertical support may be coupled to the first end of the elongate support, and a second vertical support may be coupled to the second end of the elongate support. Preferably, the vertical supports may be opposingly positioned to each other. A channel for receiving a license plate may be formed between the back plate and the frame. One or more light elements may be disposed on the frame. The device may be moved between a first position, in which upper portions of the back plate may be relatively closer to the elongate support, and a second position, in which upper portions of the back plate may be relatively farther from the elongate support.

19 Claims, 6 Drawing Sheets

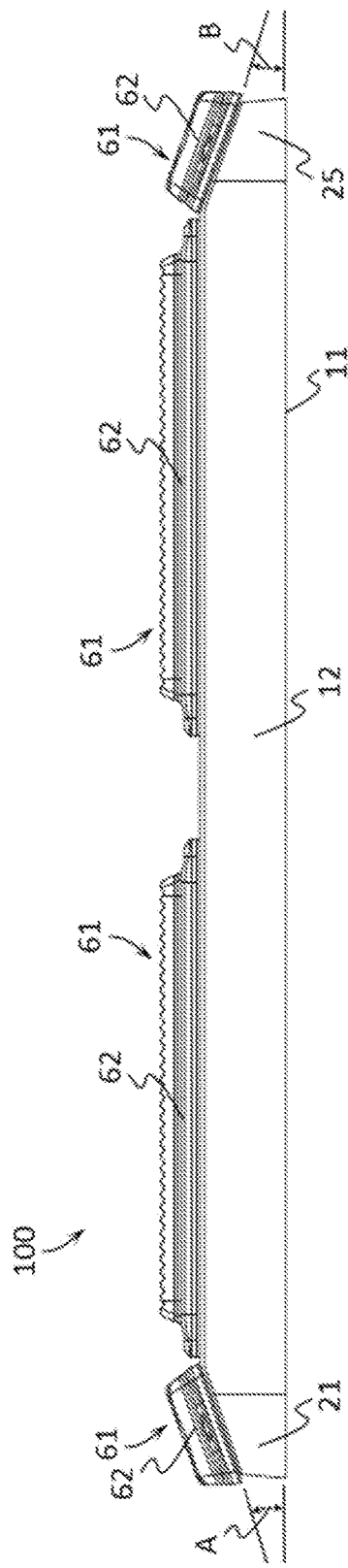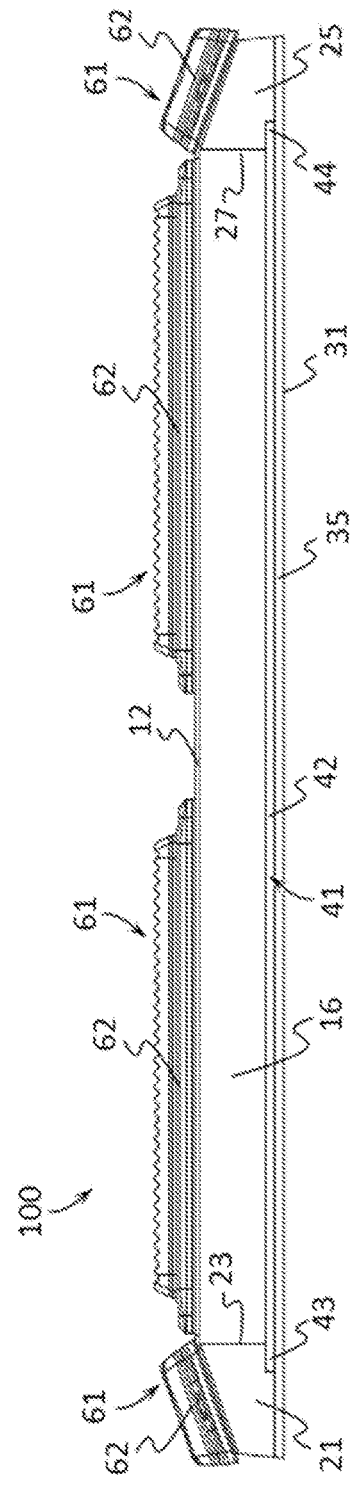

LICENSE PLATE FRAME DEVICE

FIELD OF THE INVENTION

This patent specification relates to the field of license plate holders or frames. More specifically, this patent specification relates to license plate holders or frames which are configured to illuminate and which do not obscure the information contained on a license plate.

BACKGROUND

License plate or tag frames that are configured to illuminate currently exist and serve the purpose of enhancing the visibility, and therefore safety and effectiveness, of many emergency and public service vehicles. While emergency warning lighting is employed on various portions of emergency vehicles, illuminating license plate holders seek to mount warning lights to vehicles without putting additional holes or other permanent modifications to the exterior of the vehicles. Some currently existing illuminating license plate holder designs are either a plastic or metal frame that sits over the license plate. Other existing design is a bracket, having one or more lights, which is bolted to the license plate to hold one or more lights proximate to the license plate while extending around and covering the perimeter of the license plate.

One drawback of most existing illuminating license plate holder designs is that they cover one or more portions of a license plate contained therein, obscuring county, state, tax or renewal information. However, it is illegal to cover or obscure this information. Another problem with current designs is they their installation can interfere with now mandated reverse cameras on modern emergency vehicles such as police cars. Typically, these vehicles have a reverse camera mounted in or proximate to the license plate area and this area is often not sized to accommodate both a camera and an illuminating license plate holder resulting in partial obstruction of the camera's field of view and/or modifications to the exterior of the vehicle.

Therefore a need exists for novel license plate holders or frames which are suitable for use on emergency vehicles and which are configured to illuminate. There is also a need for novel illuminating license plate holders or frames which do not require permanent modifications to the exterior of the vehicles during installation. A further need exists, for novel illuminating license plate holders or frames which do not cover important information contained on a license plate such as county, state, tax or renewal information. Finally, a need exists for novel illuminating license plate holders or frames which are able to be mounted on vehicles having a reverse camera mounted in or proximate to the license plate area.

BRIEF SUMMARY OF THE INVENTION

A license plate frame device is provided. In some embodiments, the device may include a frame which may be movably coupled to a back plate. The frame may comprise an elongate support having a first end and a second end. A first vertical support may be coupled to the first end of the elongate support, and a second vertical support may be coupled to the second end of the elongate support. Preferably, the vertical supports may be opposingly positioned to each other, and the back plate may be movably coupled to both vertical supports. A channel for receiving a license plate may be formed between the back plate and the frame. One or more light elements may be disposed on the frame opposing positioned to the back plate. The device may be moved between a first position, in which upper portions of the back plate may be relatively closer to the elongate support, and a second position, in which upper portions of the back plate may be relatively farther from the elongate support.

In further embodiments, the device may include a first fastener configured to movably couple the first vertical support to the back plate, and a second fastener configured to movably couple the second vertical support to the back plate.

In still further embodiments, the first vertical support may have a first vertical surface, the second vertical support may have a second vertical surface, the elongate support may have an elongate surface, and the first vertical surface and second vertical surface may each be angled below the elongate surface.

In still further embodiments, the device may include a processing unit which may be configured to control the duration, frequency, time periods, and/or strength of light emitted by the light elements.

BRIEF DESCRIPTION OF THE DRAWINGS

Some embodiments of the present invention are illustrated as an example and are not limited by the figures of the accompanying drawings, in which like references may indicate similar elements and in which:

FIG. 5 illustrates a top plan view of an example of a license plate frame device according to various embodiments described herein.

FIG. 6 shows a bottom plan view of an example of a license plate frame device according to various embodiments described herein.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
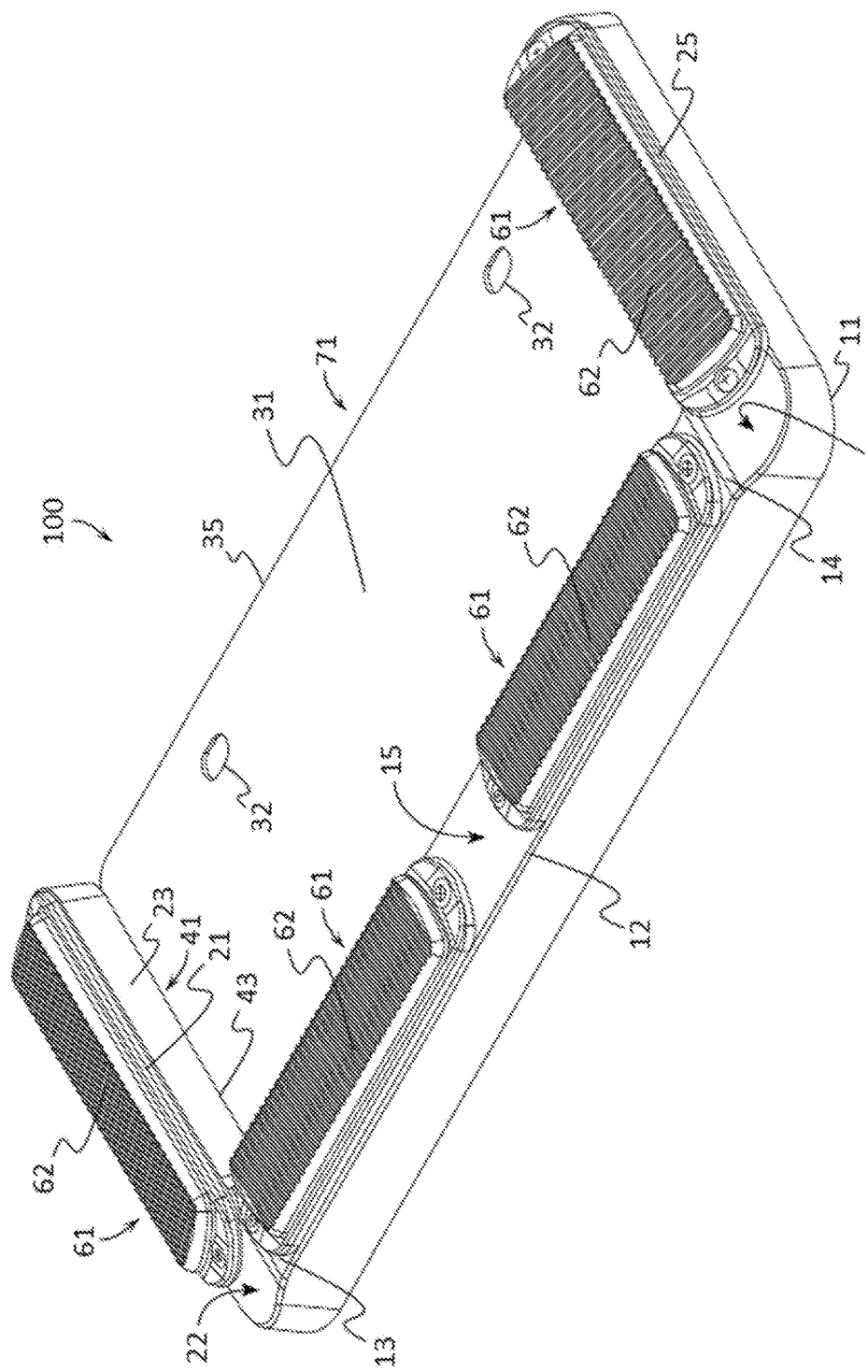
FIG. 1 depicts a perspective view of an example of a license plate frame device in a first position according to various embodiments described herein.

For purposes of description herein, the terms "upper", "lower", "left", "right", "rear", "front", "side", "vertical", "horizontal", and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first", "second", etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new license plate holder or frame is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by example and through referencing the appended figures representing preferred and alternative embodiments. FIGS. 1-9 illustrate examples of a license plate frame device ("the device") 100 according to various embodiments. In some embodiments, the device 100 may include a frame 11 which may be movably coupled to a back plate 31. The frame 11 may comprise an elongate support 12 having a first end 13 and a second end 14. A first vertical support 21 may be coupled to the first end 13 of the elongate support 12, and a second vertical support 25 may be coupled to the second end 14 of the elongate support 12. Preferably, the vertical supports 21, 25, may be opposingly positioned to each other, and the back plate 31 may be movably coupled to both vertical supports 21, 25. A channel 41 for receiving a license plate may be formed between the back plate 31 and the frame 11. One or more light elements 61 may be disposed on the frame 11 with each opposing positioned to the back plate 31. The device 100 may be moved between a first position 71 (FIGS. 1, 3, and 4), in which upper portions of the back plate 31 may be relatively closer to the elongate support 12, and a second position 72 (FIG. 2), in which upper portions of the back plate 31 may be relatively farther from the elongate support 12.

Optionally, the frame 11 may comprise one or more supports such as an elongate support 12, a first vertical support 21, and/or a second vertical support 25. In preferred embodiments, the frame 11 may comprise an elongate support 12 with a first vertical support 21 and a second vertical support 25 coupled to opposing ends of the elongate support 12 to form a generally U-shaped frame 11. A generally U-shaped frame 11 may be formed by two or more vertical supports 21, 25, which may be coupled approximately perpendicularly, between 70 and 110 degrees, to one or more elongate supports 12. In further preferred embodiments, the elongate support 12 may have a length that is greater than the lengths of the first vertical support 21 and second vertical support 25, while in other embodiments, the supports 12, 21, 25, may be configured with any other relative lengths.

The frame 11 may be made of or comprise any substantially durable and rigid material such as steel alloys, aluminum, various types of hard plastics, such as polyethylene (PE), polypropylene (PP) and polyvinyl chloride (PVC), polycarbonate, nylon, Poly(methyl methacrylate) (PMMA) also known as acrylic, melamine, hard rubbers, fiberglass, carbon fiber, resins, such as epoxy resin, wood, or any other material including combinations of materials that are substantially durable and rigid.

In some embodiments, the device 100 may comprise one or more elongate supports 12 which may be positioned generally towards the bottom of the device 100 so that the bottom of a license plate received by the device 100 may be positioned proximate to the one or more elongate supports 12. An elongate support 12 may comprise one or more elongate surfaces 17 to which one or more light elements 61 may be coupled to or disposed on. An elongate wall 16 may be coupled to an elongate surface 15 and the elongate wall 16 may comprise a bottom channel 42 which may be shaped to receive a portion of a license plate received by the device 100, such as all or a portion of the bottom perimeter of the license plate.

In some embodiments, the device 100 may comprise one or more first vertical supports 15 which may be positioned generally towards a first side, such as the left side, of the device 100 above the elongate support 12 so that a second side of a license plate received by the device 100 may be positioned proximate to the one or more first vertical supports 15. A first vertical support 21 may comprise one or more first vertical surfaces 21 to which one or more light elements 61 may be coupled to or disposed on. A first vertical wall 23 may be coupled to a first vertical surface 22, and the first vertical wall 23 may comprise a first vertical channel 43 which may be shaped to receive a side portion, such as the left side, of a side perimeter of a license plate received by the device 100.

In some embodiments, the device 100 may comprise one or more second vertical supports 16 which may be positioned generally towards a second side, such as the right side, of the device 100 above the elongate support 12 so that a second side of a license plate received by the device 100 may be positioned proximate to the one or more second vertical supports 16. A second vertical support 25 may comprise one or more second vertical surfaces 24 to which one or more light elements 61 may be coupled to or disposed on. A second vertical wall 27 may be coupled to a second vertical surface 26, and the second vertical wall 27 may comprise a second vertical channel 44 which may be shaped to receive a side portion, such as the right side, of a side perimeter of a license plate received by the device 100.

In preferred embodiments, the vertical walls 23, 27, of the vertical supports 21, 25, may be spaced apart or separated by approximately 11 to 12 inches, and more preferably by 11.2 to 11.8 inches. In further preferred embodiments, the frame 11 may comprise a U-shape formed by a elongate wall 16 having a length of approximately 11.2 to 11.8 inches and two vertical walls 23, 27, having a length of approximately 5.2 to 5.8 inches.

Figure 2:
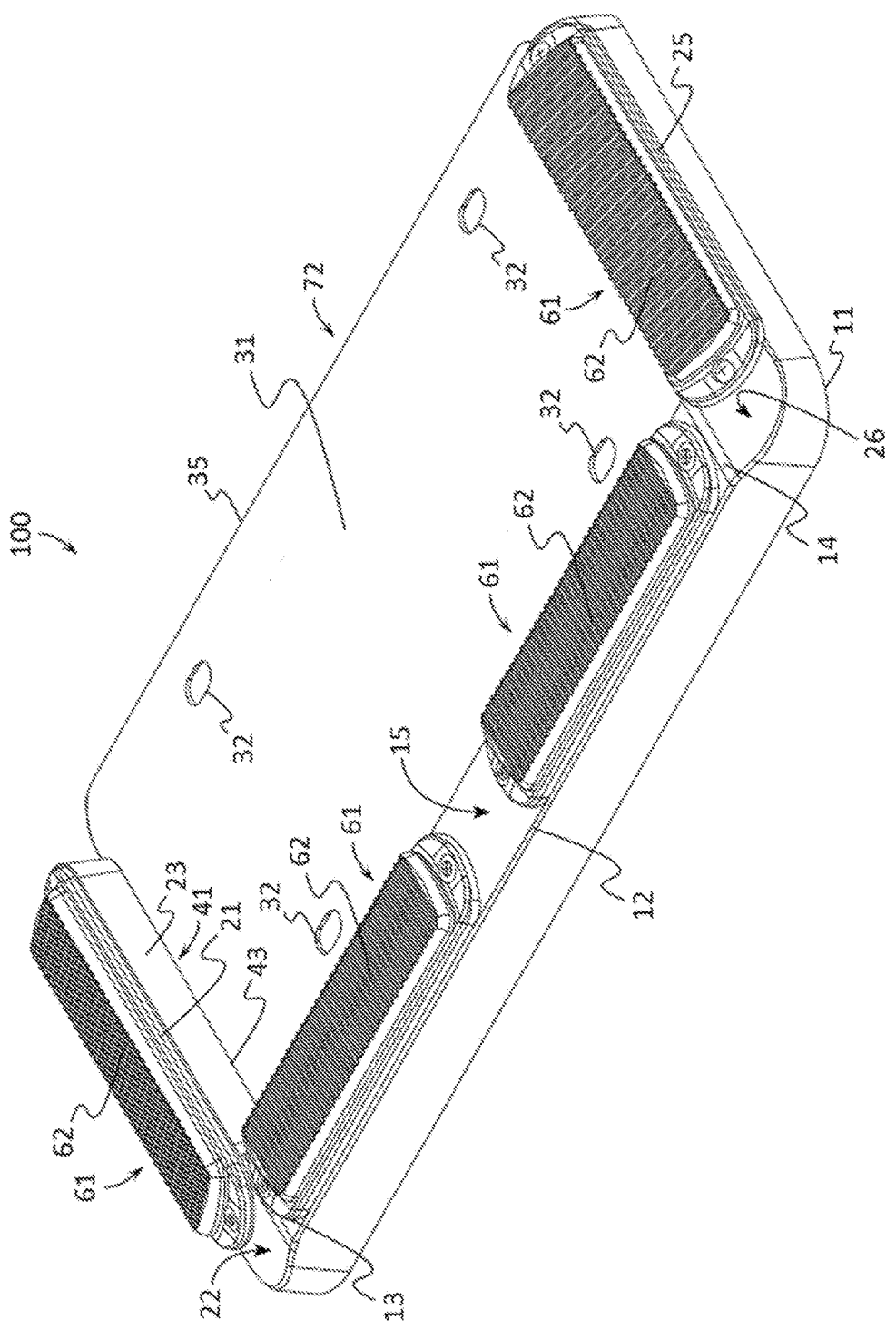
FIG. 2 illustrates a perspective view of an example of a license plate frame device in a second position according to various embodiments described herein.
Figure 3:
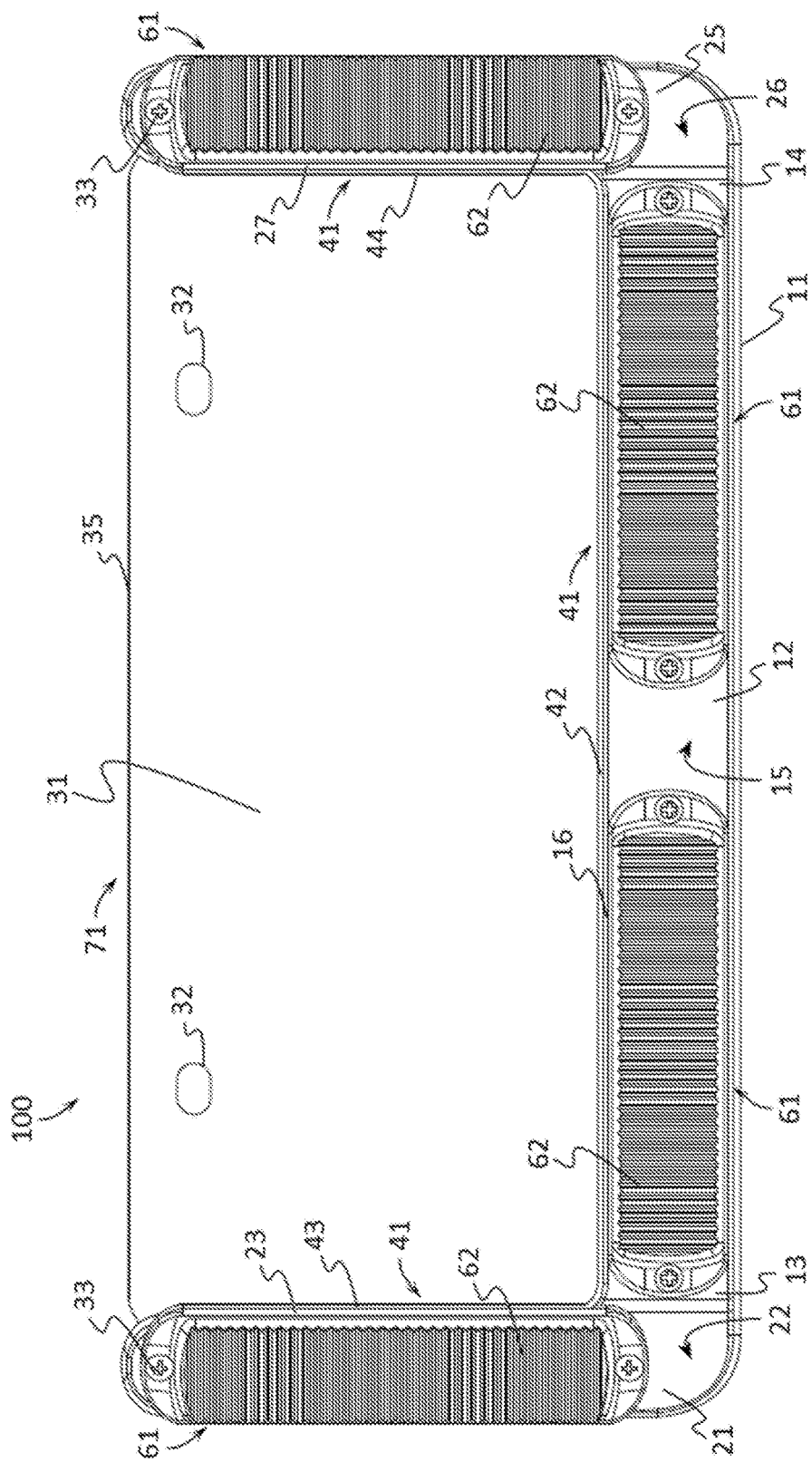
FIG. 3 shows a front elevation of an example of a license plate frame device according to various embodiments described herein.
Figure 4:
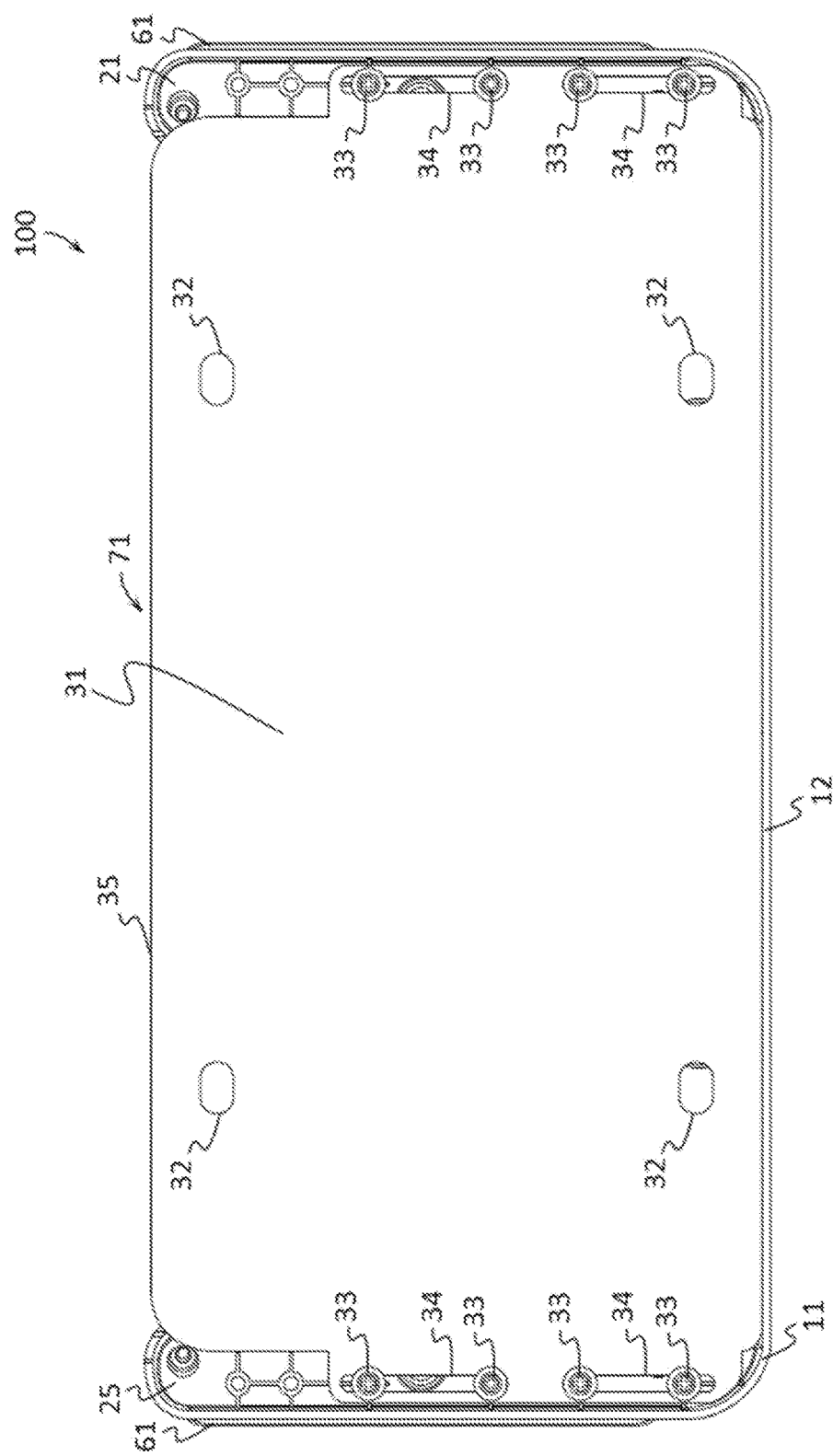
FIG. 4 depicts a rear elevation of an example of a license plate frame device according to various embodiments described herein.
Figure 7:
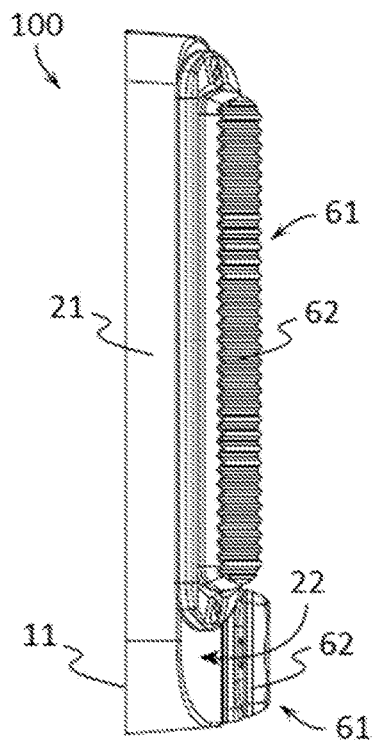
FIG. 7 depicts a first side elevation of an example of a license plate frame device according to various embodiments described herein.

In some embodiments, one or more of the surfaces 15, 22, 26, may be generally planar in shape, while in other embodiments, one or more of the surfaces 15, 22, 26, may be generally convex curved, concave curved, rounded, angular, or otherwise shaped. In preferred embodiments, the elongate surface 15, first vertical surface 22, and second vertical surface 26 may each be planar in shape with the first vertical surface 22 and second vertical surface 26 each angled below the elongate surface 15. For example, the device 100 may comprise Angle A (FIG. 2) and Angle B (FIG. 2). Angle A may describe the angle that the first vertical surface 22 is angled below the elongate surface 15, while Angle B may describe the angle that the second vertical surface 26 is angled below the elongate surface 15. Preferably, Angle A may be between 1 and 45 degrees and Angle B may be between 1 and 45 degrees. Angle A and Angle B may also describe how far the first vertical surface 22 and/or a light element 61 coupled thereto may be angled away from the second vertical surface 26 and/or a light element 61 coupled thereto.

The device 100 may comprise one or more back plates 31 which may be coupled, preferably movably coupled, to the frame 11. Similar to the frame 11, a back plate 31 may be made from or comprise any substantially durable and rigid material. In some embodiments, a back plate 31 may be planar and comprise a generally rectangular shape that may be approximately equal to or larger than a license plate that the device 100 is configured to receive. In other embodiments, a back plate 31 may be configured in any other shape or size. The back plate 31 may comprise a plate upper perimeter 35 which may be the portion of the back plate 31 that is relatively farther away from the elongate support 12. In some embodiments, the device 100 may be moved between a first position 71 (FIGS. 1, 3, and 4), in which the plate upper perimeter 35 may be relatively closer to the elongate support 12, and a second position 72 (FIG. 2), in which the plate upper perimeter 35 may be relatively farther from the elongate support 12.

A back plate 31 may comprise one or more mounting apertures 32 which may be shaped and sized to receive a fastener, which may be used to couple a back plate 31 to a vehicle. Preferably, the back plate 31 may comprise two or more mounting apertures 32 which may be spaced to accommodate preexisting fasteners or fastener aperture which may be found on a vehicle and which typically are used to secure a license plate to a vehicle. In some embodiments, the back plate 31 may comprise four mounting apertures 32 spaced in a grid or box pattern having a length of approximately seven inches and a width of approximately 4$^{11}/_{16}$ inches. Additionally, each mounting aperture 32 may comprise a length of approximately ⅝ of an inch and a width of approximately $^{5}/_{16}$ of an inch. In other embodiments, the back plate 31 may comprise two mounting apertures 32 spaced approximately 5 and ¾ inches apart.

The device 100 may comprise one or more back plates 31 which may be movably coupled to the frame 11. In preferred embodiments, the device 100 may comprise one or more fasteners 33 and one or more fastener apertures 34 which may be configured to movably couple a back plate 31 to the frame 11. A fastener 33 may comprise a threaded fastener such as a bolt, screw, or the like, a clasp fastener, a clip fastener, a turn-to-lock connection method, a push-to-lock connection method, or any other type of fastener or connection method which may be used to allow the device 100 to be moved between a first position 71 and a second position 72. A fastener aperture 34 may be configured to receive a portion of a fastener 33, and a fastener 33 may be inserted through a fastener aperture 34 in a back plate 31 and also through a fastener aperture 34 in the frame 11 to couple the frame 11 to the back plate 31.

Preferably, the fastener(s) 33 may be used to maintain the device 100 in a first position 71, a second position 72, or a position between the first position 71 and second position 72. For example, the back plate 31 may comprise one or more fastener apertures 34 having an elongated shape and the vertical supports 21, 25, may comprise one or more fastener apertures 34 having a circular shape. A first screw type fastener 33 may be inserted through an elongated fastener aperture 34 of the back plate 31 and threadedly engaged to a fastener aperture 34 of a first vertical support 21, and a second screw type fastener 33 may be inserted through another elongated fastener aperture 34 of the back plate 31 and threadedly engaged to a fastener aperture 34 of a second vertical support 21. When the fasteners 33 are relatively loose, the back plate 31 may be moved relative to the frame 11 a distance corresponding to the length of the elongated fastener apertures 34 of the back plate, and when the fasteners 33 are relatively tight, the back plate 31 may not be moved relative to the frame 11, thereby enabling the fasteners 33 to movably couple the frame 11 to the back plate 31 while allowing the device 100 to be configured in a first position 71, a second position 72, or a position between the first position 71 and second position 72.

While in some embodiments, the device 100 may comprise one or more fasteners 33 and/or fastener apertures 34 which may be configured to movably couple the frame 11 to a back plate 31, in other embodiments, a frame 11 may be movably coupled to a back plate with one or more springs or other tensioning devices, magnetic fasteners, clip type fasteners, or any other fastener or coupling method which may enable a frame 11 to be coupled to a back plate 31. In further embodiments, the device 100 may comprise one or more fasteners 33 and/or fastener apertures 34 which may be configured to removably or reposition-ably couple the frame 11 to a back plate 31 to allow the device 100 to be moved between a first position 71, a second position 72, or a position between. In further embodiments, the device 100 may comprise one or more fasteners 33 and/or fastener apertures 34 which may be configured to couple the frame 11 to a back plate 31 in a non-removable or non-repositionable manner so that once moved into a first position 71, a second position 72, or a position between, the device 100 may not be moved out of that position.

The device 100 may comprise one or more channels 41 which may be used to receive, secure, couple, or otherwise attach a license plate to the device 100. Preferably, a channel 41 may be shaped to receive one or more portions of the perimeter of a license plate, such as a bottom portion, a right side portion, and/or a left side portion. A channel 41 may be formed between the frame 11 and a back plate 31 so that one or more portions of the perimeter of a license plate may be received between the frame 11 and a back plate 31 when a license plate is received in the channel 41.

In some embodiments, the channel 41 may comprise or be formed by one or more bottom channels 42, first vertical channels 43, and/or second vertical channels 44. All or portions of a bottom channel 42 may be formed between the back plate 31 and into or coupled to the elongate wall 16 of the elongate support 12 with the bottom channel 42 shaped to receive between 1.0 mm and 30 mm of the depth of the bottom perimeter of a license plate received in the channel 41.

All or portions of a first vertical channel 43 may be formed between the back plate 31 and into or coupled to the first vertical wall 23 of the first vertical support 21 with the first vertical channel 43 shaped to receive between 1.0 mm and 30 mm of the depth of the left side perimeter of a license plate received in the channel 41. All or portions of a second vertical channel 44 may be formed between the back plate 31 and into or coupled to the second vertical wall 27 of the second vertical support 25 with the second vertical channel 44 shaped to receive between 1.0 mm and 30 mm of the depth of the right side perimeter of a license plate received in the channel 41. While a bottom channel 42, first vertical channel 43, and/or a second vertical channel 44 may receive a side of a license plate to a depth of between 1.0 mm and 30 mm, a bottom channel 42, first vertical channel 43, and/or a second vertical channel 44 may receive approximately between 1% and 100% the length of a side of the license plate.

The device 100 may comprise one or more light elements 61 which may be positioned anywhere on the device 100 and which may be configured to provide or illuminate with various colors and intensities of light. In preferred embodiments, one or more light elements 61 may be positioned or disposed in the frame 11 opposite to a back plate 31. For example, one or more light elements 61 may be disposed on a elongate surface 15, a first vertical surface 22, and/or a second vertical surface 26, thereby enabling the light element(s) 51 to be disposed on the frame 11 and opposing positioned to the back plate 31. In further preferred embodiments, a light element 61 disposed on a first vertical support 21 may be angled between 1 and 45 degrees away from the second vertical support 25. In still further preferred embodiments, a light element 61 disposed on a second vertical support 25 may be angled between 1 and 45 degrees away from the first vertical support 21.

In some embodiments, a light element 61 may comprise one or more light emitting diodes (LEDs) which may be configured to provide light of various wavelengths and intensities. In other embodiments, a light element 61 may comprise an organic light-emitting diode (OLED), incandescent light bulb, fluorescent light, bulb halogen light bulb, high-intensity discharge light bulb, laser light emitter, electroluminescent light source, neon light source, or any other type of suitable light source.

Optionally, a light element 61 may comprise one or more light diffusing covers 62 which may cover and protect a LED or other light source from moisture dirt and other contaminants. A light diffusing cover 62 may be made from or comprise a optionally tinted or colored transparent or translucent material such as polycarbonate, acrylic or polyacrylate made from Methyl Methacrylate (MMA), Poly Methyl Methacrylate, or a combination of both, polystyrene, glass, or any other substantially transparent or translucent material. In preferred embodiments, a light element 61 may comprise a light diffusing cover 62 which may direct, diffuse, or otherwise manipulate the direction and/or color of light emitted by a light element. For example, a light diffusing cover 62 may comprise one or more, such as a plurality, of ridges such as may be found on a Fresnel lens.

Figure 9:
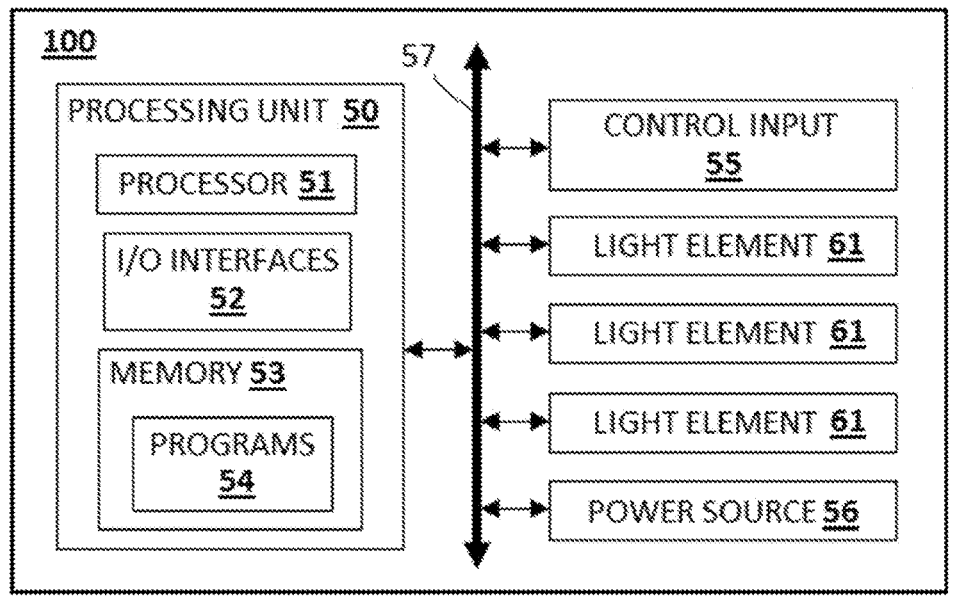
FIG. 9 shows a block diagram of an example of a license plate frame device according to various embodiments described herein.

FIG. 9 illustrates a block diagram showing some of the elements or components of an exemplary license plate frame device 100 according to various embodiments described herein. In some embodiments and in the present example, the device 100 can be a digital device that, in terms of hardware architecture, comprises a processing unit 50 which may generally include a processor 51, input/output (I/O) interfaces 52, and memory 53. Additionally, the device 100 may include one or more control inputs 55, power sources 56, and light elements 61 which may be in communication with the processing unit 50. The processing unit 50 and one or more elements that may be in communication with the processing unit 50 may preferably be housed or located anywhere within the frame 11 or located anywhere else on the device 100.

It should be appreciated by those of ordinary skill in the art that FIG. 9 depicts the device 100 in an oversimplified manner, and a practical embodiment may include additional components or elements and suitably configured processing logic to support known or conventional operating features that are not described in detail herein. The components and elements (50, 51, 52, 53, 55, 56, 61) are communicatively coupled via a local interface 57.

The local interface 57 can be, for example but not limited to, one or more, circuit boards, buses or other wired or wireless connections, as is known in the art. The local interface 57 can have additional elements, which are omitted for simplicity, such as controllers, buffers (caches), drivers, repeaters, and receivers, among many others, to enable communications. Further, the local interface 57 may include address, control, and/or data connections to enable appropriate communications among the aforementioned components.

The processor 51 is a hardware device for executing software instructions. The processor 51 can be any custom made or commercially available processor, a central processing unit (CPU), an auxiliary processor among several processors associated with the processing unit 51, a semiconductor-based microprocessor (in the form of a microchip or chip set), or generally any device for executing software instructions. When the processing unit 51 is in operation, the processor 51 is configured to execute software stored within the memory 53, to communicate data to and from the memory 53, and to generally control operations of the device 100 pursuant to the software instructions.

The I/O interfaces 52 can be used to receive and/or output information from the device 100. The I/O interfaces 52 can also include, for example, a serial port, a parallel port, a small computer system interface (SCSI), an infrared (IR) interface, a radio frequency (RF) interface, a universal serial bus (USB) interface, one or more sensors, and the like.

Figure 8:
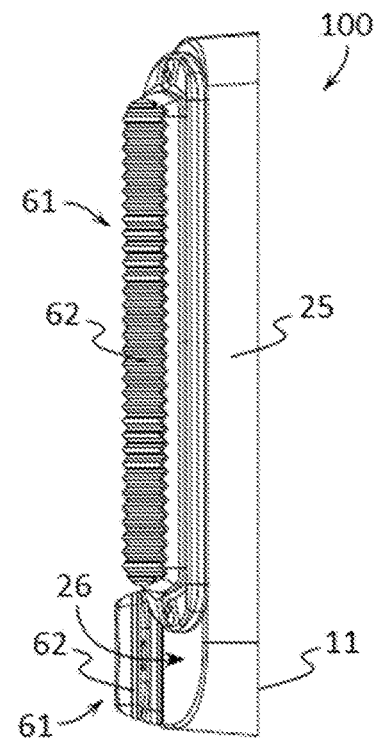
FIG. 8 illustrates a second side elevation of an example of a license plate frame device according to various embodiments described herein.

The memory 53 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 53 may incorporate electronic, magnetic, optical, and/or other types of storage media. Note that the memory 53 may have a distributed architecture, where various components are situated remotely from one another, but can be accessed by the processor 51. The software in memory 53 can include one or more software programs, each of which includes an ordered listing of executable instructions for implementing logical functions. In the example of FIG. 8, the software in the memory system 53 includes programs 54. The programs 54 may include various applications, add-ons, etc. configured to provide end user functionality with the device 100. In a typical example, the end user typically uses one or more of the programs 54 to control the duration, frequency, time periods, and/or strength of the light emitted by the light elements 61. In preferred embodiments, a program 54 may enable the processing unit 50 to control light emitted from one or more of the light elements 61 so that the light may be emitted continuously (steady burn/not flashing) at one or more intensities, such as a low intensity. In further preferred embodiments, a program 54 may enable the processing unit 50 to control light emitted from one or more of the light elements 61 so that the light emitted may be dimmed or dimmable to lower intensity such as at night.

In some embodiments, the device 100 may optionally comprise one or more control inputs 55 that a user may interact with such as turnable control knobs, depressible button type switches, a key pad, slide type switches, rocker type switches, or any other suitable input that may be used to modulate functions of the device 100 such as the duration, frequency, time periods, and/or strength of the light emitted by the light elements 61. It should be understood that the processing unit 50 and the control inputs 55 are optional components of the device 100 and that the duration, frequency, time periods, and/or strength of the light emitted by the light elements 44 may be controlled by a processing unit 50 and/or a control input 55.

In some embodiments, the device 100 may optionally comprise a power source 56 which may provide electrical power to any component of the device 100 that may require electrical power, such as to the light elements 61, and the like. In some embodiments, a power source 56 may comprise a power cord, kinetic or piezo electric battery charging device, a solar cell or photovoltaic cell, and/or inductive charging or wireless power receiver. In further embodiments, a power source 56 may comprise a battery, such as a lithium ion battery, nickel cadmium battery, alkaline battery, or any other suitable type of battery, a fuel cell, a capacitor, a super capacitor, or any other type of energy storing and/or electricity releasing device. In some embodiments, a processing unit 50 may govern power supplied from the power source 56 to a light element 61 as dictated by one or more programs 54 to control light emitted from one or more light elements 61. In further embodiments, a control input 55 may govern power supplied from the power source 56 to a light element 61.

While some materials have been provided, in other embodiments, the elements that comprise the device 100 such as the frame 11, back plate 31, light element(s) 61, optional elongate support 12, optional first vertical support 21, optional second vertical support 25, optional light diffusing cover 62, and/or any other element discussed herein may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A license plate frame device, the device comprising:
a frame comprising an elongate support having a first end and a second end, a first vertical support coupled to the first end of the elongate support, and a second vertical support coupled to the second end of the elongate support, the second vertical support opposingly positioned to the first vertical support;
a back plate movably coupled to the frame and configured to slide between a first position and a second position relative to the frame and having a plate upper perimeter;
a channel formed between the back plate and the frame;
a first light element disposed on the frame, wherein the first light element is opposing positioned to the back plate; and
wherein the frame is configured in a U shape without any structure located between the first and second vertical supports opposite to the elongate support thereby fully exposing all of the back plate upper perimeter.

2. The device of claim 1, further comprising a processing unit configured to control light emitted from the light element.

3. The device of claim 1, further comprising a first fastener configured to movably couple the first vertical support to the back plate, and further comprising a second fastener configured to movably couple the second vertical support to the back plate.

4. The device of claim 1, further comprising a second light element disposed on the first vertical support and a third light element disposed on the second vertical support.

5. The device of claim 4, wherein the first light element is disposed on the elongate support.

6. The device of claim 1, wherein the first vertical support comprises a first vertical surface having a second light element and wherein the second vertical support comprises a second vertical surface having a third light element, wherein the elongate support comprises an elongate surface, and wherein the first vertical surface and second vertical surface are each angled below and away from the elongate surface causing the second and third light elements to illuminate an area outwardly and away from the license plate frame device at more than 180 degrees.

7. The device of claim 6, wherein a first angle (A) is formed as an angle between the first vertical surface and the elongate surface and a second angle (B) is formed as an angle between the second vertical surface and the elongate surface and wherein both first and second angles are less than 45 degrees.

8. The device of claim 1, wherein the channel comprises a first vertical channel formed between a portion of the first vertical support and the back plate, and wherein the channel comprises a second vertical channel formed between a portion of the second vertical support and the back plate.

9. The device of claim 8, wherein the channel comprises a bottom channel formed between a portion of the elongated support and the back plate.

10. The device of claim 1, wherein the light element comprises a light diffusing cover.

11. A license plate frame device, the device comprising:
a generally U-shaped frame comprising an elongate support having a first end and a second end, a first vertical support coupled to the first end of the elongate support, and a second vertical support coupled to the second end of the elongate support, the second vertical support opposingly positioned to the first vertical support without any structure opposing the elongate support located between the first and second vertical supports thereby providing an fully unobstructed view of a back plate upper perimeter;
a back plate movably coupled to the frame and configured to slide between a first position and a second position relative to the frame;
a channel formed between the back plate and the frame, wherein the channel comprises a first vertical channel formed between a portion of the first vertical support and the back plate, and wherein the channel comprises a second vertical channel formed between a portion of the second vertical support and the back plate; and
a light element disposed on the frame, wherein the light element is opposing positioned to the back plate.

12. The device of claim 11, further comprising a processing unit configured to control light emitted from the light element.

13. The device of claim 11, further comprising a first fastener configured to movably couple the first vertical support to the back plate, and further comprising a second fastener configured to movably couple the second vertical support to the back plate.

14. The device of claim 11, comprising a light element disposed on the first vertical support and a light element disposed on the second vertical support.

15. The device of claim 14, comprising a light element disposed on the elongate support.

16. The device of claim 11, wherein the first vertical support comprises a first vertical surface, wherein the second vertical support comprises a second vertical surface, wherein the elongate support comprises an elongate surface, and wherein the first vertical surface and second vertical surface are each angled below and outwardly away from the elongate surface.

17. The device of claim 11, wherein the back plate comprises an elongate mounting aperture configured to allow the backplate to move from a first position to a second position relative to the frame and while still being coupled to the frame.

18. The device of claim 17, wherein the channel comprises a bottom channel formed between a portion of the elongated support and the back plate.

19. The device of claim 11, wherein the light element comprises a light diffusing cover.

* * * * *